(12) United States Patent
Kim et al.

(10) Patent No.: US 11,888,302 B2
(45) Date of Patent: Jan. 30, 2024

(54) ELASTIC ATTACHING MEMBER AND AUTOMOTIVE WIRING MEMBER WITH ELASTIC ATTACHING MEMBER

(71) Applicant: Sumitomo Wiring Systems, Ltd., Yokkaichi (JP)

(72) Inventors: Kyungwoo Kim, Yokkaichi (JP); Toshinari Kobayashi, Yokkaichi (JP); Hironobu Yamamoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 315 days.

(21) Appl. No.: 17/441,116

(22) PCT Filed: Mar. 3, 2020

(86) PCT No.: PCT/JP2020/008790
§ 371 (c)(1),
(2) Date: Sep. 20, 2021

(87) PCT Pub. No.: WO2020/195590
PCT Pub. Date: Oct. 1, 2020

(65) Prior Publication Data
US 2022/0149608 A1 May 12, 2022

(30) Foreign Application Priority Data

Mar. 22, 2019 (JP) .................. 2019-055169

(51) Int. Cl.
*H02G 3/32* (2006.01)
*B60R 16/02* (2006.01)

(52) U.S. Cl.
CPC .............. *H02G 3/32* (2013.01); *B60R 16/02* (2013.01)

(58) Field of Classification Search
CPC ....................................................... H02G 3/32
USPC ......................................................... 174/135
See application file for complete search history.

(56) References Cited

U.S. PATENT DOCUMENTS 11,448,343 B2 * 9/2022 Hagen .................. E21B 17/026
2020/0169071 A1 * 5/2020 Kawaguchi .......... H02G 3/0468

FOREIGN PATENT DOCUMENTS

| JP | 11-252749   | * | 9/1999 |
| JP | H11-252749 A |   | 9/1999 |
| JP | 2003-180020 | * | 6/2003 |

(Continued)

OTHER PUBLICATIONS

International Search Report, Application No. PCT/JP2020/008790, dated Apr. 21, 2020. ISA/Japan Patent Office.

*Primary Examiner* — Stanley Tso
(74) *Attorney, Agent, or Firm* — Honigman LLP

(57) ABSTRACT

An object is to be able to increase the force necessary for removal in a state where an elastic attaching member is attached to an attachment target member as much as possible. An elastic attaching member for attaching an attachment component to an attachment target member includes an elastic main body part formed from an elastic material and a high rigidity part formed from a material more rigid than the elastic main body part, the elastic main body part covering at least part of the attachment component, part of the high rigidity part being embedded in the elastic main body part, and another part of the high rigidity part protruding outward from at least part of the elastic main body part to form a protruding part.

7 Claims, 5 Drawing Sheets

(56) References Cited

FOREIGN PATENT DOCUMENTS

| JP | 2003-180020 A | 6/2003 |
|---|---|---|
| JP | 2004-255719 A | 9/2004 |

\* cited by examiner

ELASTIC ATTACHING MEMBER AND AUTOMOTIVE WIRING MEMBER WITH ELASTIC ATTACHING MEMBER

CROSS-REFERENCE TO RELATED APPLICATIONS

This application is the U.S. national stage of PCT/JP2020/008790 filed on Mar. 3, 2020, which claims priority of Japanese Patent Application No. JP 2019-055169 filed on Mar. 22, 2019, the contents of which are incorporated herein.

TECHNICAL FIELD

The present disclosure relates to an elastic attaching member and an automotive wiring member with elastic attaching member.

BACKGROUND ART

JP 2004-255719A discloses a configuration in which an embedding part of a bracket made from a synthetic resin is embedded in and fixed to a synthetic resin molded part.

Here, an attachment component such as an electrical wire may be attached to an attachment target member via an elastic attaching member. It is desired to increase the force necessary for removal in a state where the elastic attaching member is attached to the attachment target member as much as possible.

In view of this, an object of the present disclosure is to be able to increase the force necessary for removal in a state where an elastic attaching member is attached to an attachment target member as much as possible.

SUMMARY

An elastic attaching member of the present disclosure is an elastic attaching member for attaching an attachment component to an attachment target member, and includes an elastic main body part formed from an elastic material, and a high rigidity part formed from a material more rigid than the elastic main body part, the elastic main body part covering at least part of the attachment component, part of the high rigidity part being embedded in the elastic main body part, and another part of the high rigidity part protruding outward from at least part of the elastic main body part to form a protruding part.

Advantageous Effects of Invention

According to the present disclosure, it becomes possible to be able to increase the force necessary for removal in a state where an elastic attaching member is attached to an attachment target member as much as possible.

DETAILED DESCRIPTION OF PREFERRED EMBODIMENTS

Figure 1:
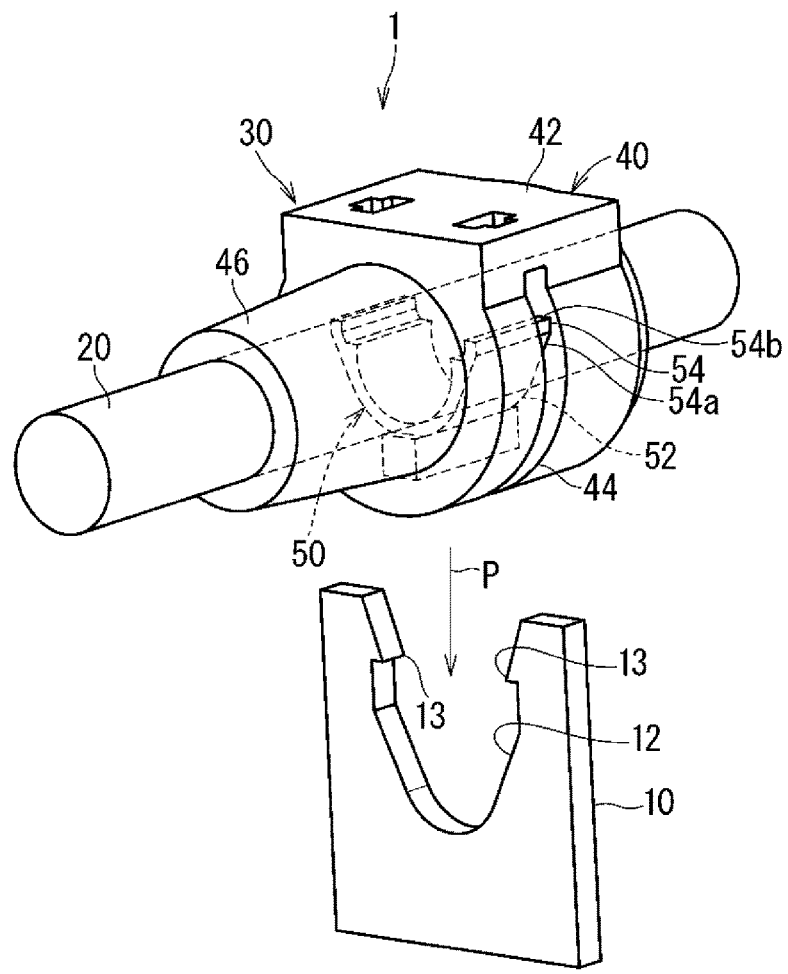
FIG. 1 is a perspective view showing an automotive wiring member with elastic attaching member according to Embodiment 1.

Initially, embodiments of the present disclosure will be enumerated and described.

An elastic attaching member of the present disclosure is as follows.

An elastic attaching member for attaching an attachment component to an attachment target member, provided with an elastic main body part formed from an elastic material, and a high rigidity part formed from a material more rigid than the elastic main body part, the elastic main body part covering at least part of the attachment component, part of the high rigidity part being embedded in the elastic main body part, and another part of the high rigidity part protruding outward from at least part of the elastic main body part to form a protruding part. The elastic attaching member is thereby attached to the attachment target member in a state where the protruding part of the high rigidity part catches on the attachment target member. In this state, deformation of the protruding part inwardly is inhibited, since the high rigidity part is formed of a more rigid material than the elastic main body part. Thus, it is possible to increase the force necessary for removal as much as possible.

A circumferential groove into which the attachment target member fits may be formed in the elastic main body part, and the protruding part may be formed to partially protrude inside the circumferential groove. The elastic attaching member is attached at a fixed position and a fixed orientation to the attachment target member, due to the attachment target member fitting into the circumferential groove.

The protruding part may be exposed on an outer side of the elastic main body part. Since the protruding part catches on the attachment target member directly, it is possible to increase the force necessary for removal as much as possible.

An elastic covering part that covers at least part of the protruding part may be further provided. Since at least part of the protruding part is covered by an elastic covering part, the occurrence of abnormal noise can be inhibited.

The high rigidity part may include an extension part that extends from the protruding part and protrudes on an outer side relative to the elastic main body part. The protruding part is readily deformed inwardly, by applying an external force to the extension part. The elastic attaching member is thereby readily detached from the attachment target member.

The protruding part may include a guide surface facing successively inwardly in a mounting direction in which the elastic main body part is mounted to the attachment target member. Because the guide surface directly or indirectly contacts the attachment target member when mounting the elastic main body part to the attachment target member, the protruding part is readily deformed inwardly. The elastic attaching member can thereby be readily mounted to the attachment target member.

The protruding part may include a removal stopping surface located on an opposite side to the guide surface in the mounting direction and facing in an opposite direction to the mounting direction. The attachment target member directly or indirectly catches on the removal stopping surface, in a state where the elastic attaching member is readily mounted to the attachment target member. The force necessary for removal can thereby be increased as much as possible.

An automotive wiring member with elastic attaching member of the present disclosure is as follows.

An automotive wiring member with elastic attaching member provided with a wiring member including a wire as the attachment target member, and the elastic attaching member in which the elastic main body part covers at least part of the wire. The automotive wiring member can thereby be securely fixed.

Specific examples of an elastic attaching member and an automotive wiring member with elastic attaching member of the present disclosure will be described below, with reference to the drawings. Note that the present disclosure is not limited to these illustrative examples and is defined by the claims, and all changes that come within the meaning and range of equivalency of the claims are intended to be embraced therein.

Embodiment 1

Figure 2:
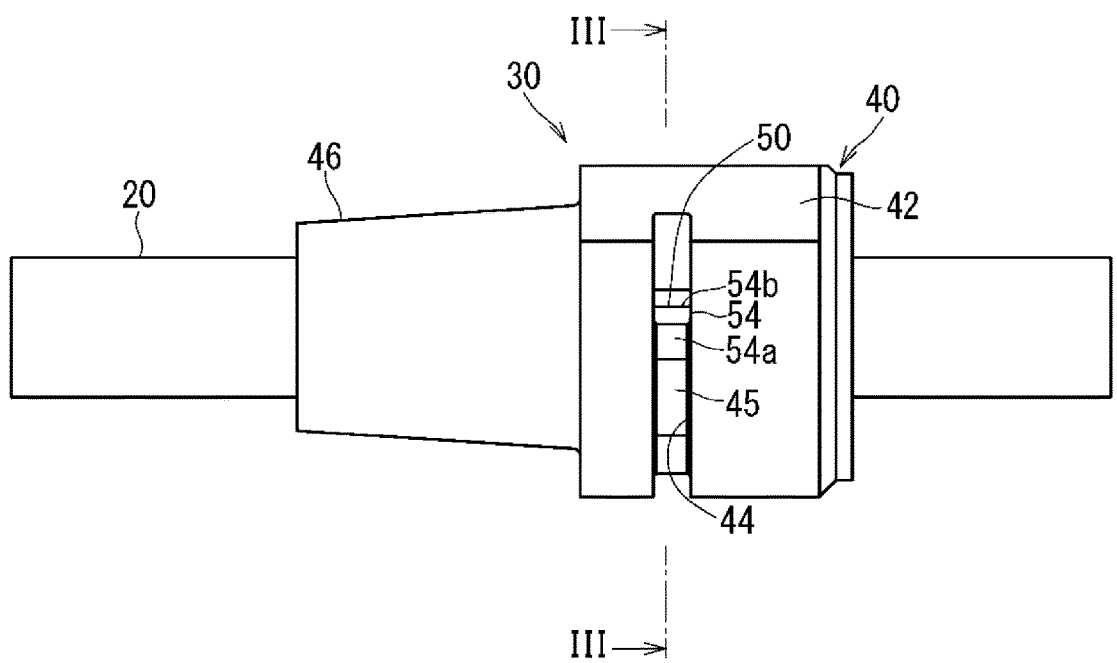
FIG. 2 is a side view showing the automotive wiring member with elastic attaching member.
Figure 3:
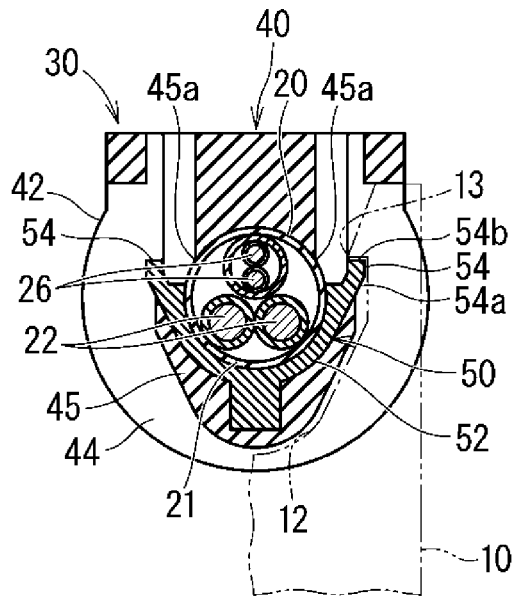
FIG. 3 is a cross-sectional view taken along line III-III in FIG. 2.

Hereinafter, an elastic attaching member and an automotive wiring member with elastic attaching member according to Embodiment 1 will be described. FIG. 1 is a perspective view showing an automotive wiring member 1 with elastic attaching member according to Embodiment 1, FIG. 2 is a side view showing the automotive wiring member 1 with elastic attaching member, and FIG. 3 is a cross-sectional view taken along line III-III in FIG. 2. An attachment target member 10 to which an elastic attaching member 30 is to be attached is shown in FIG. 1. The right half of the attachment target member 10 is illustrated in FIG. 3.

The elastic attaching member 30 is a member for attaching an attachment component to the attachment target member 10.

Regarding Attachment Component

A wiring member 20 is envisaged as an example of the attachment component. The wiring member 20 is a linear member that transmits electrical signals or electric power. Here, the wiring member 20 is provided with a plurality of wires 22 and 26 and a sheath 21 that covers the plurality of wires. The wiring member 20 is provided with two wires 22 and two wires 26. The wires 22 and 26 include lead wires formed from metal or the like and a covering that covers the circumference of the lead wires. The wires 22 and 26 may be members that transmit electrical signals or may be members that transmit power. Here, the wires 22 are thicker than the wires 26. The wires 22 are power lines that transmit power, for example. The wires 26 are signal lines that transmit electrical signals, for example. The two wires 26 are covered by a sheath in a twisted state.

The wiring member 20 is used as an automotive wiring member for connecting electrical devices in a car, for example. The wiring member 20 is connected to an opposing electrical device via a connector or the like. The case where, for example, the wiring member 20 is used as a composite cable for wheels that is routed between the body and wheels of a car is envisaged as an example. In this case, the wires 22 are used as power lines for supplying power to an EPB (Electric Parking Brake) and the like. Also, the wires 26 are used as signal lines for transmitting signals from a sensor for detecting the speed of the wheels in ABS (Anti-Lock Brake System).

The attachment component may, additionally, be any of various long members such as a brake hose or a tube for supplying washer liquid. Naturally, the attachment component is not limited to these examples. The attachment component may be any component that includes a portion capable of being covered by an elastic main body part 40 (discussed later) of the elastic attaching member 30.

Regarding Attachment Target Member

The attachment target member 10 is the portion to which the elastic attaching member 30 is attached. Here, the attachment target member 10 is constituted by a plate member in which a recessed part 12 is formed. The attachment target member 10 is envisaged to be a member attached to the car body or the like by welding, screwing or the like. More specifically, the recessed part 12 is formed to be recessed interiorly from the front end portion of a rectangular plate member formed from a metal plate or the like. The recessed part 12 is formed to be wider and deeper than the cross-sectional size of the wiring member 20 (cross-section orthogonal to the axis of the wiring member 20). The wiring member 20 and the elastic attaching member 30 attached to the wiring member 20 are routed inside the recessed part 12.

A pair of removal stopping parts 13 are provided in a protruding manner on portions near the opening of both side portions of the recessed part 12. The removal stopping parts 13 are portions that hold the elastic main body part 40 inside the recessed part 12 in a state where removal is stopped. For example, the removal stopping parts 13 are formed to successively face outwardly toward the opening of the recessed part 12. The portion of the removal stopping parts 13 on the interior of the recessed part 12 is formed to face the interior of the recessed part 12. A protruding part 54 (discussed later) of the elastic attaching member 30 catches on the removal stopping parts 13, in a state where the wiring member 20 and the elastic attaching member 30 are routed inside the recessed part 12. The wiring member 20 is thereby attached to the attachment target member 10 via the elastic attaching member 30. Note that, in the following description, the direction in which the elastic main body part 40 is mounted to the attachment target member 10 may be referred to as a mounting direction P.

Elastic Attaching Member

The elastic attaching member 30 is provided with the elastic main body part 40 and a high rigidity part 50. This elastic attaching member may also be called a grommet.

The elastic main body part 40 is formed from an elastic material. The elastic material is rubber or urethane resin, for example. The elastic main body part 40 covers at least part of the wiring member 20. Here, part of an intermediate portion of the wiring member 20 in the extending direction is covered by the elastic main body part 40.

More specifically, the elastic main body part 40 is provided with a thick part 42 and a thin part 46. The thick part 42 is formed in a shape having a flat rectangular parallelepiped portion that is continuous with one side portion of a circular tube-shaped portion. The thin part 46 is continuous with one end portion of the thick part 42. The thin part 46 is formed in a circular tube shape that is thinner than the thick part 42. Here, the thin part 46 is formed in a shape that gradually becomes thinner toward the opposite end portion from the end portion on the side that is continuous with the thick part 42. The wiring member 20 passes through the circular tube-shaped portion of the thick part 42 and the center of the thin part 46.

The width of the thick part 42 is larger than the width of the recessed part 12. A circumferential groove 44 is formed in the circular tube-shaped portion of the thick part 42. Here, it can also be said that the circumferential groove 44 is formed in two side portions and a lower portion of the thick part 42. Note that the lower side of the thick part 42 is the side in the fitting direction when the elastic main body part 40 is fitted into the recessed part 12, and the upper side is the opposite side thereto. The two sides of the thick part 42 are the sides of the circular tube-shaped portion of the thick part 42 orthogonal to the up-down direction.

The width of the circumferential groove 44 is set to be the same as or smaller than the thickness of the attachment target member 10 (small enough to be able to press on the attachment target member 10). Also, the portion of the thick part 42 defined by a bottom surface 45 of the circumferential groove 44 is set to a size that can fit inside the recessed part 12. Thus, when the portion of the elastic main body part 40 in which the circumferential groove 44 is formed is fitted into the recessed part 12, the peripheral portion of the recessed part 12 enters the circumferential groove 44. The elastic main body part 40 is thereby positioned at a fixed position in the extending direction of the wiring member 20 relative to the attachment target member 10. A groove may also be formed only in both side portions of the thick part. If a circumferential groove is formed in both side portions and the lower portion of the thick part as described above, the elastic main body part 40 is more reliably positioned at a fixed position relative to the attachment target member 10.

Since the attachment target member 10 fixes the wiring member 20 via the elastic main body part 40, the fixing force that is applied to the wiring member 20 can be spread over a wide area. Also, the elastic main body part 40 is elastically deformable together with the wiring member 20. Thus, even in the case where a force that bends the wiring member 20 is applied, the place that bends tends not to be concentrated at the end portions of the elastic attaching member 30, and the bend radius of the wiring member 20 can be enlarged as much as possible.

The high rigidity part 50 is formed from a more rigid material than the elastic main body part 40. The high rigidity part 50 is formed from a resin that is harder than the material forming the elastic main body part 40, or a metal such as steel or stainless steel, for example. Note that, as will be discussed later, the protruding part 54 of the high rigidity part 50 catches on the removal stopping parts 13 due to being elastically deformable inwardly. The high rigidity part 50 is formed from a material that is elastically deformable enough to enable the protruding part 54 to be displaced.

Part of the high rigidity part 50 is embedded in the elastic main body part 40. The high rigidity part 50 is thereby held at a fixed position and orientation relative to the elastic main body part 40. Another part of the high rigidity part 50 protrudes outward from at least part of the elastic main body part 40 and forms the protruding part 54. This protruding part 54 is a portion that catches on the removal stopping parts 13, in a state where the elastic main body part 40 is routed inside the recessed part 12.

More specifically, the high rigidity part 50 is provided with a semi-annular part 52 and the protruding part 54.

The semi-annular part 52 is semi-annular in shape. The inner circumferential surface of the semi-annular part 52 is an arc-shaped circumferential surface capable of routing the wiring member 20. Here, the curvature radius of the arc-shaped circumferential surface coincides with the radius of the wiring member 20. Thus, part of the wiring member 20 is fitted into the semi-annular part 52, in a state where around half of the outer circumferential surface of the wiring member 20 is in surface contact with the arc-shaped inner circumferential surface of the semi-annular part 52. A protruding part is provided in a protruding manner on an intermediate portion of the outer circumferential surface of the semi-annular part 52 in the width direction. The outer circumferential surface of the semi-annular part 52 is formed in a shape that is continuous from the protruding part to a sloped surface via a curved side.

The semi-annular part 52 of the high rigidity part 50 is embedded inside the elastic main body part 40. Here, the semi-annular part 52 is embedded in the portion of the thick part 42 in which the circumferential groove 44 is formed. More specifically, the semi-annular part 52 is provided, inside the elastic main body part 40, at a position surrounding the wiring member 20 provided inside the elastic main body part 40. In this state, the semi-annular part 52 is oriented to be open on the rectangular parallelepiped portion side of the elastic main body part 40. Also, both end portions of the semi-annular part 52 are located at the bottom of the circumferential groove 44.

The protruding part 54, which is another part of the high rigidity part 50, is provided on both end sides of the semi-annular part 52. The protruding part 54 is formed in a shape facing outward from both ends of the semi-annular part 52. Given that both end portions of the semi-annular part 52 are located at the bottom of the circumferential groove 44, the protruding part 54 is a portion formed to protrude from the bottom of the circumferential groove 44, and partially protrude inside the circumferential groove 44. Note that the bottom of the circumferential groove 44 is also part of the elastic main body part 40. Thus, the protruding part 54 is a constituent component that protrudes from at least part of the elastic main body part 40. Also, in the present embodiment, the protruding part 54 is exposed on the outer side of the elastic main body part 40; here, on the outer side of the bottom of the circumferential groove 44. Here, a configuration is adopted in which a pair of protruding parts 54 are provided one on either side of the elastic main body part 40, but a configuration may also be adopted in which a protruding part is only provided on one side of the elastic main body part.

A guide surface 54a that faces successively inwardly in the mounting direction P (center side of elastic main body part 40 in width direction) is formed on an outwardly facing portion of the protruding part 54. Here, a portion on the base end side of the outwardly facing portion of the protruding part 54 is formed as the guide surface 54a. A portion on the front end side of the outwardly facing portion of the protruding part 54 is formed as a flat surface parallel with the mounting direction P. In the extending direction of the wiring member 20, the length of the high rigidity part 50 is greater than the width of the circumferential groove 44. Thus, the protruding part 54 protrudes inside the circumferential groove 44, and is also buried inside both side surfaces of the circumferential groove 44.

The end portion of the protruding part 54 is formed in a plate shape parallel with the mounting direction P and the extending direction of the wiring member 20. The front end surface of the protruding part 54 is constituted as a removal stopping surface 54*b*. This removal stopping surface 54*b* is located on the opposite side to the guide surface 54*a* in the mounting direction P. Also, the removal stopping surface 54*b* faces in the opposite direction to the mounting direction P. Here, the removal stopping surface 54*b* is formed as a long narrow surface orthogonal to the mounting direction P.

A relief recessed part 45*a* that is more recessed than other portions is formed in a portion of the elastic main body part 40 on the inner side of the protruding part 54. The relief recessed part 45*a* can also be said to be a portion formed by a portion of the bottom of the circumferential groove 44 on the inner side of the protruding part 54 being recessed. A gap is formed on the inner side the protruding part 54 due to the relief recessed part 45*a*. The protruding part 54 can thereby readily deform on the inner side by moving into this gap. Note that, in the elastic main body part 40, a hole that faces in the opposite direction to the mounting direction P is formed from the relief recessed part 45*a*. This hole can be utilized as a space for disposing a portion of a mold for forming the relief recessed part 45*a* and for die cutting.

The elastic main body part 40 can be formed by molding part of the wiring member 20 and part of high rigidity part 50 as insert targets, for example. The manufacturing method of the elastic main body part 40 is not limited to this example. For example, a configuration may also be adopted in which the elastic main body part 40 is formed with a hole therein to enable the wiring member 20 to pass through, and the wiring member 20 is subsequently passed inside this elastic main body part 40. At this time, the elastic main body part 40 may also be molded with the high rigidity part 50 as the insert target. The portion in which the elastic main body part 40 is attached to the wiring member 20 in a state where the elastic main body part 40 covers at least part of the wiring member 20 is the automotive wiring member 1 with elastic attaching member.

The automotive wiring member 1 with elastic attaching member is attached to the attachment target member 10 in the following manner. That is, the elastic main body part 40 attached to the wiring member 20 is fitted inside the recessed part 12 of the attachment target member 10 in parallel with the mounting direction P. At this time, a peripheral portion of the recessed part 12 is disposed inside the circumferential groove 44. When the elastic main body part 40 is pushed inside the recessed part 12, the removal stopping parts 13 of the recessed part 12 contact the guide surfaces 54*a* of the protruding parts 54, and the protruding parts 54 elastically deform inwardly and fit inside the relief recessed parts 45*a*. At this time, since the elastic main body part 40 is formed from an elastic material, it is expected that not only of the protruding parts 54 but also the portions of the high rigidity part 50 that are embedded inside the elastic main body part 40 will elastically deform.

When the elastic main body part 40 is pushed further inside the recessed part 12, the protruding parts 54 pass the removal stopping parts 13. The protruding parts 54 then elastically returns to their original position. The portion of the removal stopping parts 13 that faces the interior of the recessed part 12 catches on the removal stopping surface 54*b* of the protruding parts 54 in a state where removal is stopped. The elastic main body part 40 is thereby attached to the attachment target member 10.

According to the elastic attaching member 30 and the automotive wiring member 1 with elastic attaching member constituted as described above, the elastic attaching member 30 is attached to the attachment target member 10, in a state where the protruding parts 54 of the high rigidity part 50 catch on the removal stopping parts 13 of the attachment target member 10. In this state, the protruding parts 54 are inhibited from deforming inwardly due to being formed from a more rigid material than the elastic main body part 40. Thus, it is possible to increase the force necessary for removal as much as possible. Also, the automotive wiring member 20 can be securely fixed to cars which are subject to considerable vibration.

Also, the inner peripheral edge portion of the recessed part 12 of the attachment target member 10 fits into the circumferential groove 44, in a state where the elastic main body part 40 is attached to the attachment target member 10. Thus, the elastic attaching member 30 is stably attached to the attachment target member 10 at a fixed position and a fixed orientation.

Also, in the present embodiment, since the protruding parts 54 are exposed on the outer side of the elastic main body part 40, the protruding parts 54 catch on the removal stopping parts 13 of the attachment target member 10 directly. Thus, the protruding parts 54 securely catch on the removal stopping parts 13. The force necessary for removal can thereby be increased as much as possible.

Also, when mounting the elastic main body part 40 to the attachment target member 10, the guide surfaces 54*a* directly or indirectly contact the removal stopping parts 13 of the attachment target member 10. In the present embodiment, the guide surfaces 54*a* directly contact the removal stopping parts 13. The protruding parts 54 thereby readily deform inwardly. The insertion force at the time of mounting the elastic attaching member 30 to the attachment target member 10 is thereby reduced, enabling the elastic attaching member 30 to be readily mounted.

Also, when the elastic main body part 40 is mounted to the attachment target member 10, the removal stopping parts 13 of the attachment target member 10 directly or indirectly catch on the removal stopping surfaces 54*b*. Since the removal stopping surfaces 54*b* face in the opposite direction to the mounting direction P, the removal stopping parts 13 securely catch on the removal stopping surface 54*b*. The force necessary to remove the elastic attaching member 30 can thereby be increased as much as possible.

Embodiment 2

Figure 4:
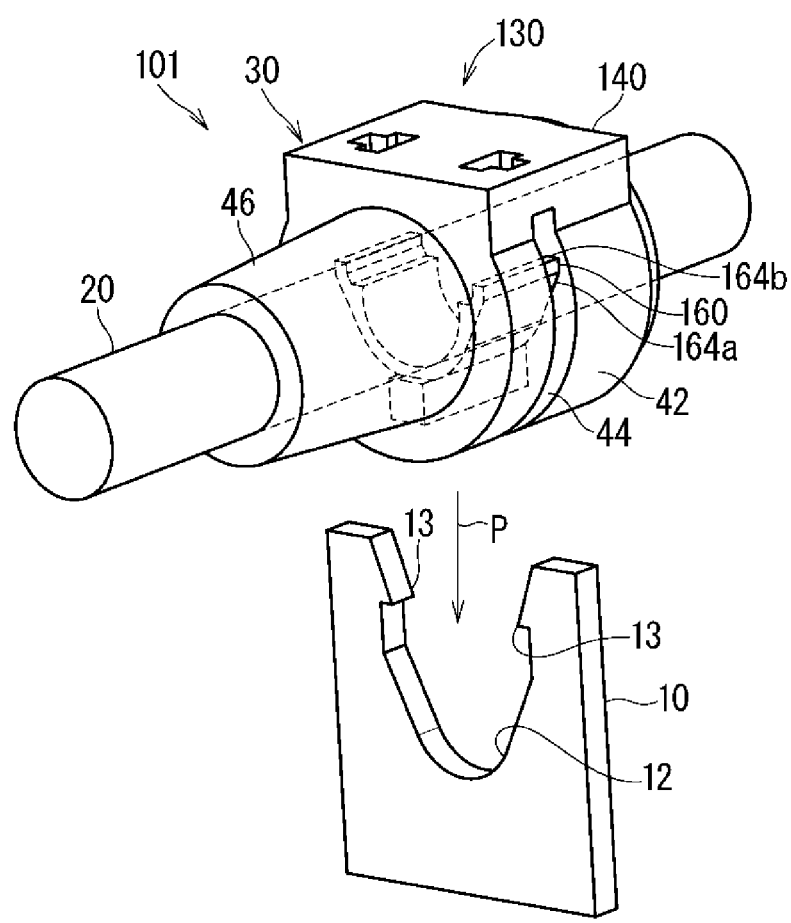
FIG. 4 is a perspective view showing an automotive wiring member with elastic attaching member according to Embodiment 2.
Figure 5:
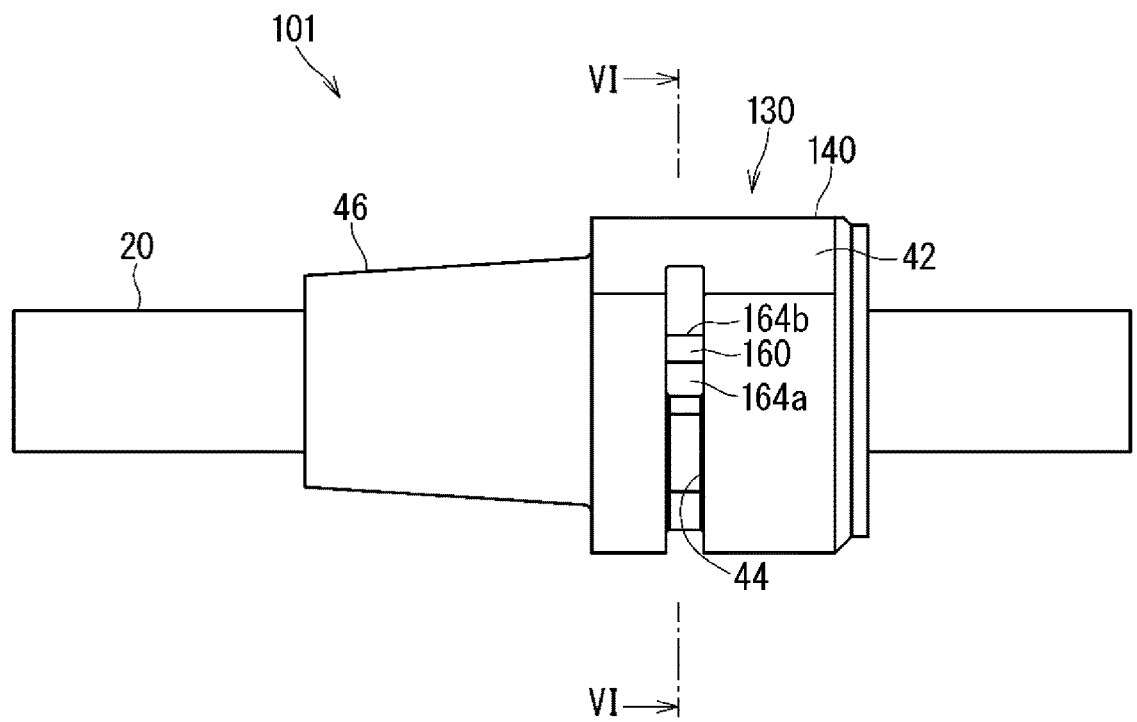
FIG. 5 is a side view showing the automotive wiring member with elastic attaching member.
Figure 6:
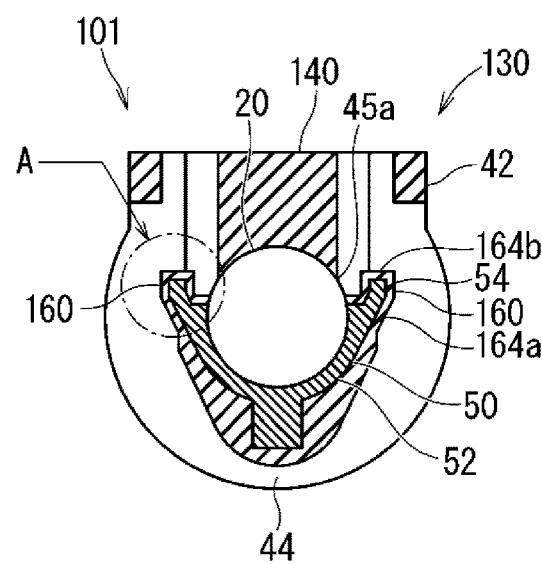
FIG. 6 is a cross-sectional view taken along line VI-VI in FIG. 5.
Figure 7:
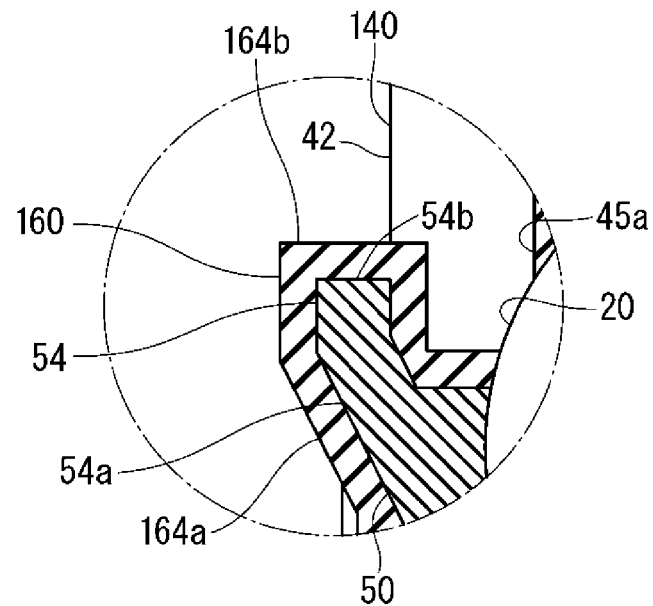
FIG. 7 is an enlarged cross-sectional view of a portion shown by arrow A in FIG. 6.

An elastic attaching member and an automotive wiring member with elastic attaching member according to Embodiment 2 will be described. FIG. 4 is a perspective view showing an automotive wiring member 101 with elastic attaching member according to Embodiment 2, FIG. 5 is a side view showing the automotive wiring member 101 with elastic attaching member, FIG. 6 is a cross-sectional view taken along line VI-VI in FIG. 5, and FIG. 7 is an enlarged cross-sectional view of a portion shown by arrow A in FIG. 6. A cross-sectional outer shape of a wiring member 20 is illustrated in FIG. 6. Note that, in the description of Embodiment 2, the same reference numerals are given to constituent elements that are similar to elements described in Embodiment 1, and description thereof will be omitted.

The automotive wiring member 101 with elastic attaching member is provided with the wiring member 20 and an elastic attaching member 130. The elastic attaching member 130 is attached to the wiring member 20 in a state of covering at least part of the wiring member 20 similarly to the above elastic attaching member 30.

The elastic attaching member 130 differs from the above elastic attaching member 30 in that the elastic attaching member 130 is further provided with an elastic covering part 160 that covers at least part of protruding part 54. The elastic covering part 160 covers a front end portion and inner and outer surfaces of the protruding part 54. In other words, the elastic covering part 160 covers the entirety of the protruding part 54. Here, since the elastic covering part 160 covers the protruding part 54 at a uniform thickness, the surface of the elastic covering part 160 has a shape conforming to the surface shape of the protruding part 54. Thus, a guide surface 164a conforming to the above guide surface 54a is formed on an outwardly facing portion of the elastic covering part 160. Also, a removal stopping surface 164b conforming to the removal stopping surface 54b is formed on a front end portion of the elastic covering part 160. The elastic covering part 160 may also be a portion molded together with the above elastic main body part 40. The elastic covering part 160 may also be a portion formed separately to the elastic main body part 40. For example, the elastic covering part 160 may also be a portion formed by immersing the protruding part 54 in a liquid for forming an elastic covering part.

The elastic covering part need not cover the entirety of the protruding part. The elastic covering part may also be formed on only a portion of the protruding part that can oppose and contact the removal stopping part in a state where the protruding part is caught on the removal stopping part, such as only on an outwardly facing portion of the protruding part 54 and a portion of the removal stopping surface 54b, for example.

This elastic attaching member 130 is also attached to an attachment target member 10 similarly to the above Embodiment 1. At this time, the protruding parts 54 contact the removal stopping parts 13 via the portion of the elastic covering parts 160 where the guide surface 164a is formed and elastically deform inwardly. Also, when the protruding parts 54 pass the removal stopping parts 13, the protruding parts 54 catch on the removal stopping parts 13 via the portion of the elastic covering parts 160 where the removal stopping surface 164b is formed.

According to Embodiment 2, similar effects to Embodiment 1 can be obtained, except for the effects due to the protruding parts 54 being exposed on the outer side of the elastic main body part 40.

Also, the protruding parts 54 are covered by the elastic covering parts 160. Thus, even in the case where vibration occurs in the car, abnormal noise caused by vibration tends not to occur between the protruding parts 54 and the attachment target member 10.

Embodiment 3

Figure 8:
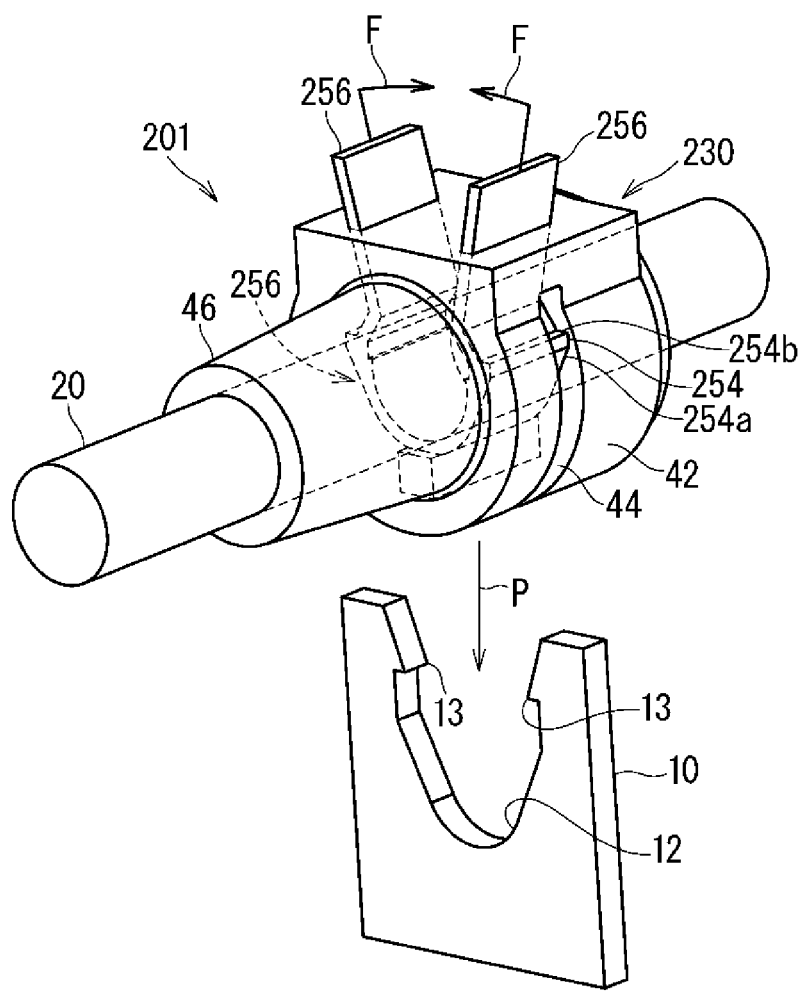
FIG. 8 is a perspective view showing an automotive wiring member with elastic attaching member according to Embodiment 3.
Figure 9:
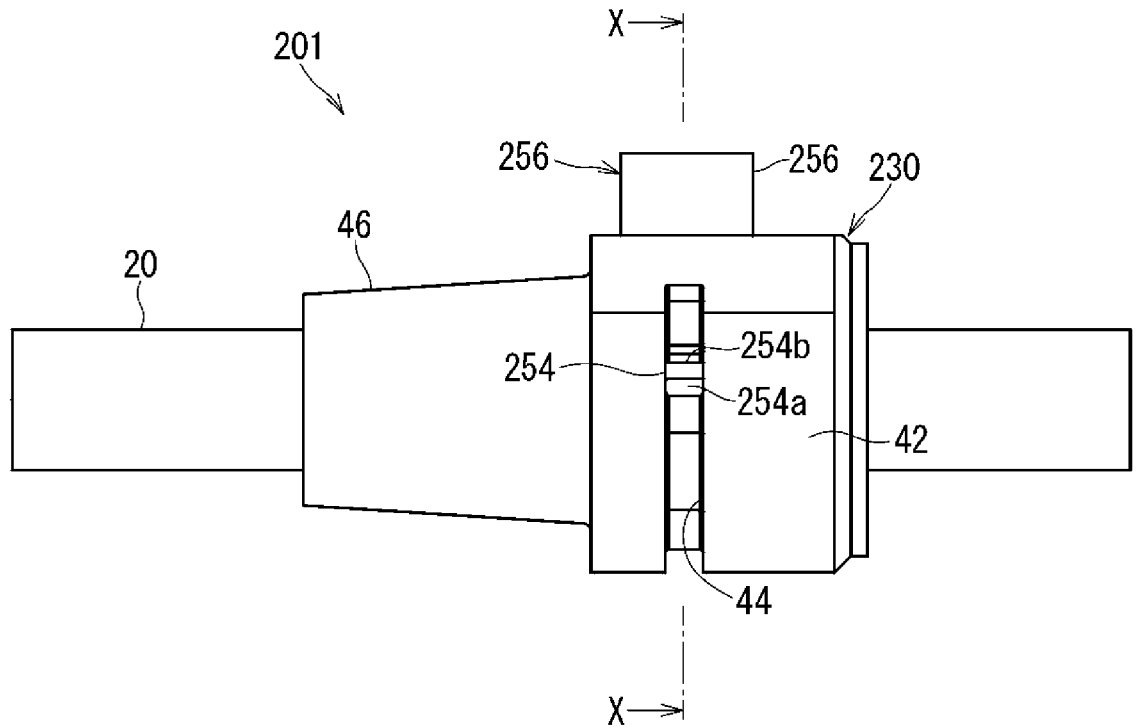
FIG. 9 is a side view showing the automotive wiring member with elastic attaching member.
Figure 10:
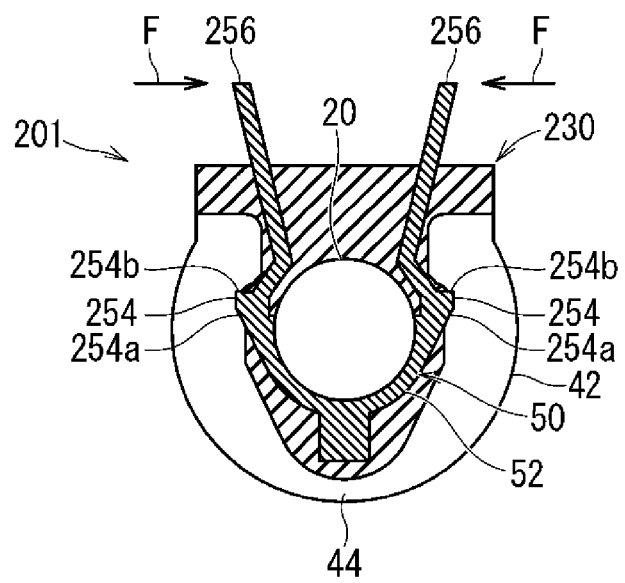
FIG. 10 is a cross-sectional view taken along line X-X in FIG. 9.

An elastic attaching member and an automotive wiring member with elastic attaching member according to Embodiment 3 will be described. FIG. 8 is a perspective view showing an automotive wiring member 201 with elastic attaching member according to Embodiment 3, FIG. 9 is a side view showing the automotive wiring member 201 with elastic attaching member, and FIG. 10 is a cross-sectional view taken along line X-X in FIG. 9. A cross-sectional outer shape of a wiring member 20 is illustrated in FIG. 10. Note that, in the description of Embodiment 3, the same reference numerals are given to constituent elements that are similar to elements described in Embodiment 1, and description thereof will be omitted.

The automotive wiring member 201 with elastic attaching member is provided with the wiring member 20 and an elastic attaching member 230. The elastic attaching member 230 is attached to the wiring member 20 in a state of covering at least part of the wiring member 20 similarly to the above elastic attaching member 30.

The elastic attaching member 230 differs from the above elastic attaching member 30 in that a high rigidity part 250 corresponding to the high rigidity part 50 includes an extension part 256. That is, the high rigidity part 250 is provided with a semi-annular part 52, a protruding part 254 corresponding to the above protruding part 54, and the extension part 256. The semi-annular part 52 is similar to the portion described in Embodiment 1.

The protruding part 254 is provided on both end sides of the semi-annular part 52, and is formed in a shape that faces outward from both ends of the semi-annular part 52, similarly to the above protruding part 54. This protruding part 254 has a guide surface 254a corresponding to the guide surface 54a and a removal stopping surface 254b corresponding to the removal stopping surface 54b, similarly to the above protruding part 54.

The thickness of the protruding part 254 is greater than the thickness of the protruding part 54. Thus, a portion on the outer side of the front end portion of the protruding part 254 is configured as the removal stopping surface 254b. Also, the extension part 256 extends in the opposite direction to the mounting direction P from a portion on the inner side of the front end portion of the protruding part 254. Here, the extension part 256 inclines in a direction that moves successively outwardly in the opposite direction to the mounting direction P. The extension part 256 extends from each of a pair of protruding parts 254. The pair of extension parts 256 extend toward the outside from an upper portion of an elastic main body part 140 corresponding to the elastic main body part 40 while moving successively apart.

This elastic attaching member 230 is also attached to an attachment target member 10 similarly to the above Embodiment 1.

Note that when the protruding parts 254 elastically yield inwardly, a portion of the elastic main body part 140 on the inner side of the protruding parts 254 and the extension parts 256 is also able to compressively deform elastically together with the protruding parts 254.

According to Embodiment 3, similar effects to Embodiment 1 can be obtained.

Additionally, the elastic attaching member 230 is readily detached from the attachment target member 10. That is, when detaching the elastic attaching member 230 from the attachment target member 10, an external force F is applied to the extension parts 256 in a direction that moves the protruding parts 254 inwardly. The protruding parts 254 thereby deform inwardly and catching of the removal stopping surfaces 54b on the removal stopping parts 13 is released. In this state, the elastic attaching member 230 is readily detached from the attachment target member 10 if the elastic attaching member 230 is pulled out from the recessed part 12 of the attachment target member 10. In particular, since a worker is able to readily apply the external force F by squeezing the pair of extension parts 256, detachment is readily performed.

Other Variations

Note that the configurations described in the above embodiments and variations can be combined as appropriate, as long as there are no mutual inconsistencies. For example, in Embodiment 3, a portion on the outer side of the protruding parts 254 may be covered by an elastic covering part as in Embodiment 2.

The invention claimed is:

1. An elastic attaching member for attaching an attachment component to an attachment target member, comprising:
   an elastic main body part formed from an elastic material; and
   a high rigidity part formed from a material more rigid than the elastic main body part,
   wherein the elastic main body part covers at least part of the attachment component,
   part of the high rigidity part is embedded in the elastic main body part,
   another part of the high rigidity part protrudes outward from at least part of the elastic main body part to form a protruding part, and
   wherein a circumferential groove into which the attachment target member fits is formed in the elastic main body part,
   and the protruding part is formed to partially protrude inside the circumferential groove.

2. The elastic attaching member according to claim 1, wherein the protruding part is exposed on an outer side of the elastic main body part.

3. The elastic attaching member according to claim 1, further comprising:
   an elastic covering part that covers at least part of the protruding part.

4. The elastic attaching member according claim 1, wherein the high rigidity part includes an extension part that extends from the protruding part and protrudes on an outer side relative to the elastic main body part.

5. The elastic attaching member according to claim 1, wherein the protruding part includes a guide surface facing successively inwardly in a mounting direction in which the elastic main body part is mounted to the attachment target member.

6. The elastic attaching member according to claim 5, wherein the protruding part includes a removal stopping surface located on an opposite side to the guide surface in the mounting direction and facing in an opposite direction to the mounting direction.

7. An automotive wiring member with elastic attaching member, comprising:
   a wiring member including a wire as the attachment target member; and
   the elastic attaching member according to claim 1, the elastic main body part covering at least part of the wire.

* * * * *